United States Patent [19]

Sakano

[11] 4,227,644
[45] Oct. 14, 1980

[54] DOCUMENT FEED APPARATUS
[75] Inventor: Yukio Sakano, Tokyo, Japan
[73] Assignee: Ricoh Company, Ltd., Tokyo, Japan
[21] Appl. No.: 915,965
[22] Filed: Jun. 15, 1978
[30] Foreign Application Priority Data
Jun. 16, 1977 [JP] Japan .................................. 52-70492
Jun. 16, 1977 [JP] Japan .................................. 52-70494
[51] Int. Cl.² ...................... G06C 11/10; G06K 7/10; B41J 11/48
[52] U.S. Cl. .................................. 235/433; 235/455; 400/580
[58] Field of Search ................ 400/210, 580; 235/432, 235/433, 455, 482; 35/48 B

[56] References Cited
U.S. PATENT DOCUMENTS

| | | | |
|---|---|---|---|
| 2,111,619 | 3/1938 | Fleming | 400/580 |
| 3,553,649 | 1/1971 | Madge | 400/580 |
| 3,643,066 | 2/1972 | Coliz | 235/455 |
| 3,692,982 | 9/1972 | Cucciati | 235/455 |
| 3,703,628 | 11/1972 | Philipson | 235/432 |
| 4,020,357 | 4/1977 | Punis | 235/455 |

Primary Examiner—Robert M. Kilgore
Attorney, Agent, or Firm—David G. Alexander

[57] ABSTRACT

Stop marks are printed on a document such as a bank passbook to indicate the position of the last data entry. The passbook is fed into the present apparatus until the lowermost stop mark is sensed. The passbook is stopped after a predetermined number of timing pulses have been counted after detection of the stop mark and another stop mark is printed on the passbook. The density of the new stop mark is sensed and, if insufficient, more stop marks are printed on top of the new stop mark until the sensed density becomes sufficient. Each stop mark may comprise two or more parallel lines which must be detected separately.

23 Claims, 13 Drawing Figures

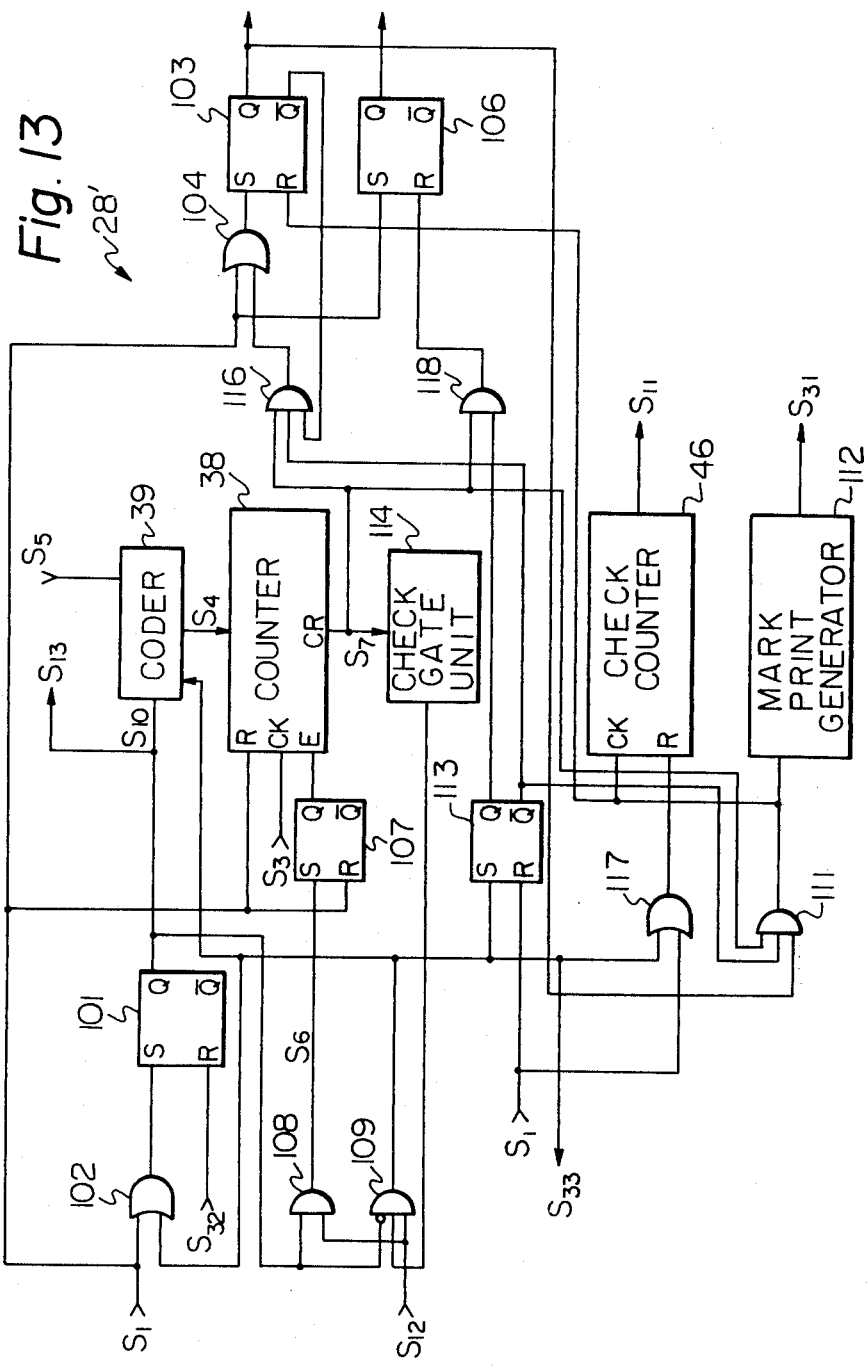

DOCUMENT FEED APPARATUS

BACKGROUND OF THE INVENTION

The present invention relates to a document feed apparatus for a bank passbook of the like.

In order to greatly facilitate customer service, "on line" computer systems have been developed for banks. The data for each customer's account is stored in the memory of a central computer. Each branch of the bank has one or more remote terminals which communicate with the central computer and thereby have instant access to each customer's account records.

Generally, each customer is given a passbook which records all the transactions for his account. When the customer makes a deposit or withdrawal, the bank teller inserts the passbook into the terminal and enters the amount of the transaction. The computer then computes the customer's new balance and a printer in the terminal prints the amount of the transaction, the new balance and the date in the passbook.

In order to speed up the entry of data in the customer's passbooks, it is desirable to have the terminal apparatus automatically feed the passbook to the proper position to print the new entry. To achieve this purpose, some means for sensing the position of the previous entry must be provided. It is known in the art to sense the previous line of printing per se and stop the feed of the passbook in response thereto. However, it is difficult to stop the passbook immediately due to the inertia of the mechanical feed components and it is also impossible to mount an optoelectronic sensor and a print head in the same position.

Furthermore, it is difficult to reliably sense the lowermost position of a line of alphanumeric characters such as numbers. For this reason, it is known in the art to print a stop mark adjacent to the last data entry in the passbook. The stop mark may be sensed much more reliably than the data per se. The stop mark may be in the form of a hyphen between the month and day or between the day and year of the date as printed.

In such a system the passbook is fed with its lower edge leading into the apparatus and the lowermost stop mark is sensed. Then, after the passbook has been fed a predetermined distance after sensing or detection of the stop mark, the feed of the document is stopped, a new stop mark is printed and then the data is printed next to the stop mark.

The predetermined distance may be determined by means of a monostable multivibrator or the like which produces a motor stop signal after a predetermined length of time designed to correspond to said distance. However, this is disadvantageous in that the feed speed of the passbook varies due to frictional resistance, power supply variations and other factors and the new entry is not always printed in the proper position.

Another system such as disclosed in Japanese patent publications nos. 49-131732 and 49-116923 comprises a pulse generator driven by the document feed means in a synchronous manner. When a predetermined number of pulses have been counted after detection of the stop mark, the feed is stopped and the new stop mark and data entry printed. However, the circuitry required to embody such a system is complicated since it must comprise a counter, comparator means for comparing the count in the counter with the predetermined number and coincidence means for producing a signal when the compared numbers are equal. The same problems are involved in moving the passbook by a predetermined distance to print yet another line.

Another problem of the prior art which has been heretofore unsolved relates to the replacement of ink ribbons in the printer mechanism. Unless the stop marks have sufficient density, they will not be detected reliably. Generally, the stop marks must have a higher density than is required for legibility of the data entries. For this reason, the ribbons must be replaced at unnecessarily frequent intervals as far as legibility of printed data is concerned. This constitutes inefficient use of manpower and materials as well as economic waste.

Yet another problem of the prior art is that dirt and other foreign marks or matter on the passbooks are often erroneously detected as stop marks. Thus, the new data is printed below its proper position in the passbook.

SUMMARY OF THE INVENTION

A document feed apparatus embodying the present invention comprises mark detector means for detecting a stop mark on a document, printing means for printing a stop mark on the document and feed means for feeding the document relative to the mark detector means and printing means. A pulse generator means generates pulses corresponding to feed increments of the document, and a counter means counts the pulses. Control means are constructed to control the counter means to count a predetermined number of pulses after the mark detector means detects a first stop mark on the document. The control means further controls the feed means to stop feeding the document and controls the printing means to print a second stop mark on the document spaced from the first stop mark after the counter has counted the predetermined number of pulses.

It is an object of the present invention to provide a document feed apparatus which accurately and reliably detects a stop mark printed on a document, stops the document feed in response thereto and prints a new stop mark adjacent to a new data entry.

It is another object of the present invention to simplify the electronic circuitry in a document feed apparatus in a novel and advantageous manner.

It is another object of the present invention to increase the useful life of an ink ribbon of the printing means.

It is another object of the present invention to eliminate the erroneous detection of foreign marks and matter as stop marks in a document feed apparatus.

It is another object of the present invention to ensure that stop marks printed on a document have sufficient density for reliable detection.

It is another object of the present invention to provide a generally improved document feed apparatus.

Other objects, together with the foregoing, are attained in the embodiments described in the following description and illustrated in the accompanying drawing.

BRIEF DESCRIPTION OF THE DRAWING

FIG. 13 is a more detailed block diagram of part of the apparatus illustrated in FIG. 2.

DESCRIPTION OF THE PREFERRED EMBODIMENTS

While the document feed apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
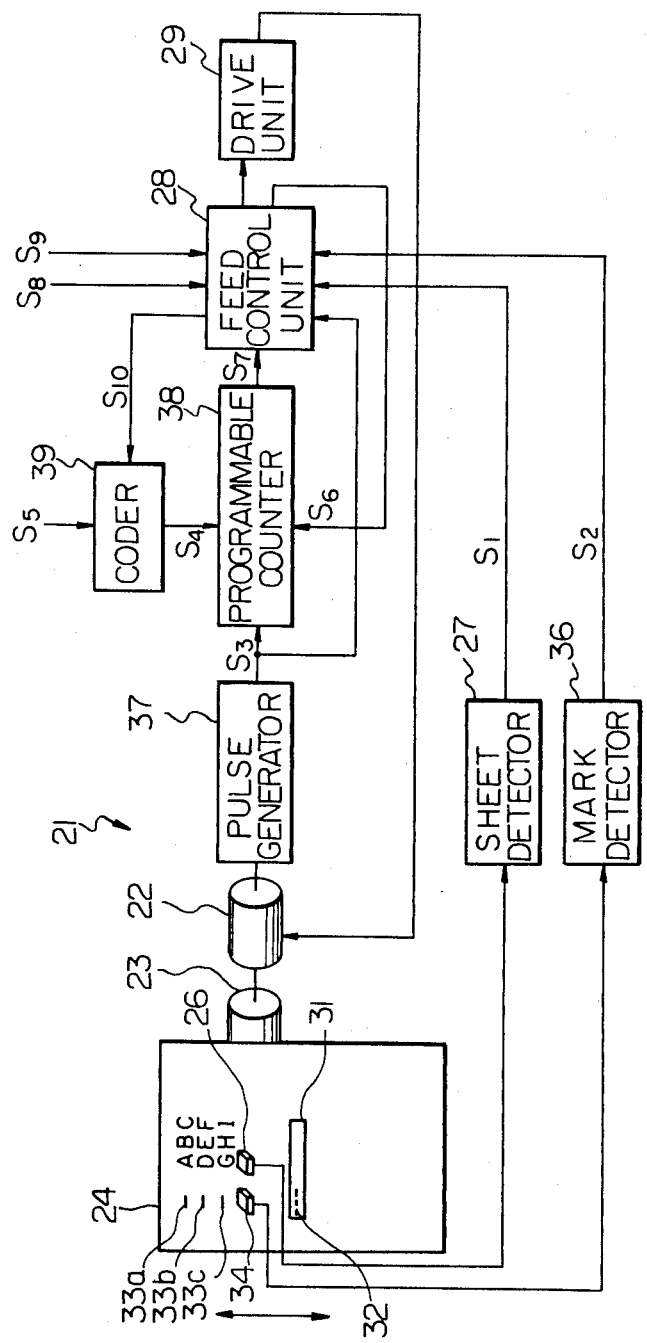
FIG. 1 is a system block diagram of a first embodiment of a document feed apparatus of the present invention.

Referring now to FIG. 1 of the drawing, a document feed apparatus embodying the present invention is generally designated by the reference numeral 21 and comprises a feed motor 22 connected to drive a feed roller 23. The motor 22 and feed roller 23 in combination are arranged to selectively feed a document such as a bank passbook 24 either downwardly (in a first direction) or upwardly (in a second direction) as will be described in detail below.

Although the framework of the apparatus 21 is not illustrated, the passbook 24 is adapted to be manually inserted into the apparatus 21 through a slot with the lower edge of the passbook 24 leading. From the slot, the passbook 24 is guided by a suitable guide member toward feeding engagement with the feed roller 23. A sheet or document sensor 26 senses the presence of the lower (leading edge) of the passbook 24 and causes the motor 22 to be energized to feed the passbook 24 downwardly in response thereto.

More specifically, the sheet sensor 26 may be a microswitch, photoelectric sensor or the like which generates an electric signal upon detecting the lower edge of the passbook 24. A sheet detector 27 receives and waveshapes the signal from the sensor 26 to provide an electric sheet detection signal S1 which is fed to a feed control unit 28. In response to the sheet detection signal S1, the feed control unit 28 controls a drive unit 29 to energize the motor 22 for feeding the passbook 24 downwardly.

In order to determine the proper position to print the next data entry in the passbook 24, a print head 31 comprises means for printing a stop mark to the left of each data entry. The position at which the print head 31 prints each stop mark is indicated in phantom line at 32. As illustrated, three lines of data and three stop mark 33a, 33b and 33c have already been printed in the passbook 24 (the data entries are not designated by reference numerals). Each stop mark is shown as being in the form of a hyphen (-) extending perpendicular to the direction of feed of the passbook 24.

A mark sensor 34 which typically comprises a photoelectric element such as a photodiode or phototransistor (not shown) is disposed above the print head 31 for sensing the stop marks. In the exemplary embodiment shown in FIG. 1, the mark sensor 34 is disposed above the print head 31 by a distance equal to two lines of data. This distance is, of course, variable in accordance with the particular practical installation. The mark sensor 34 is connected to a mark detector 36 which produces a mark detection signal S2 upon sensing of a stop mark by the mark sensor 34.

Since the passbook 24 is fed downwardly, the first mark sensed by the mark sensor 34 is the lowermost stop mark 33c. In response, the signal S2 is generated and fed to the feed control unit 28.

A pulse generator 37 is connected to the motor 22 in such a manner as to generate feed pulses S3 in synchronism with feed increments of the passbook 24. For example, the pulse generator 37 may generate one feed pulse S3 for each 1/60" of movement of the passbook 24. Although the detailed construction of the pulse generator 37 is not the subject matter of the present invention and is not shown in detail, it is well known in the art to mount a disc formed with a plurality of circumferentially spaced slots on the shaft of the motor 22 and dispose a light source and photoelectric sensor on opposite sides of the disc respectively.

The pulses S3 are fed to the count input of a programmable counter 38. A signal S4 indicating the desired line pitch is also applied to the counter 38. The counter 38 is also known in the art as a modulo-n counter since the modulo thereof is variable (programable). The signal S4 sets the modulo of the counter 38. A signal S5 is applied to a coder 39 from a console mounted switch or the like (not shown) which is coded by the coder 39 to produce the signal S4. Typically, the signal S4 can set the modulo of the counter 38 to 1/6", ¼", ⅓" and integral multiples thereof.

Whereas the signal S1 causes the motor 22 to feed the passbook 24, the counter 38 is initially reset and remains dormant until the signal S2 is produced. In response to the signal S2, the feed control unit 28 feeds a count start signal S6 to the counter 38 which causes the same to begin counting the pulses S3. When the counter 38 reaches its capacity (modulo) and overflows, a carry signal S7 is fed from the counter 38 to the feed control unit 28. In response, the feed control unit 28 controls the drive unit 29 to deenergize the motor 22 and stop the feed of the passbook 24. Then, the feed control unit 28 controls the print head 31 to print a new stop mark on the passbook 24, although the connection is not shown in FIG. 1.

Where the distance between the print head 31 and stop mark sensor 34 is equal to two lines of printed data, the modulo of the counter 38 is set to correspond to the number of pulses S3 generated while the passbook 24 traverses one line of data. Thus, when the stop mark 33c is sensed by the sensor 34, the stop mark 33c is two lines above the printing position of the print head 31 and the proper printing position for the next line of data is one line above the print head 31. At this point, the signal S2 is produced which causes the counter 38 to begin counting. The counter 38 overflows to produce the carry signal S7 when the passbook 24 has moved downwardly by the distance of one more line. At this point the feed of the passbook 24 is stopped. The stop mark 33c is halfway between the sensor 34 and print head 31. The proper printing position on the passbook 24 for the next line of data is directly under the print head 31. After the passbook 24 has been stopped in this position, the print head 31 prints a new stop mark in the position 32 followed by the next data entry.

Where only one line of data is printed, the new stop mark becomes the reference stop mark for printing the next data entry when the passbook 24 is inserted into the apparatus 21 at a later date to make another transaction. After printing the data, the feed control unit 28 causes the drive unit 29 to drive the motor 22 in the opposite direction and feed the passbook 24 upwardly out of the apparatus 21 through the slot.

Where it is necessary to print two or more lines of data to record a single transaction, the first new stop mark and line of data are printed in the manner described above. Then, the feed control unit 28 controls the drive unit 29 to drive the motor 22 so as to feed the passbook 24 upwardly by one line. The pulse generator 37 and counter 38 stop the passbook 24 after being fed by one line by counting the pulses S3 and producing the carry signal S7 in the same manner as described above. Then, another stop mark is printed followed by another line of data. This procedure is repeated until all of the required lines of data have been printed. Then, the passbook 24 is fed upwardly out of the apparatus 21 in the same manner as for printing one line of data.

The apparatus 21 may also be operated in a manual feed mode in which the operator views the printing position of the passbook 24 through a window (not shown). Control switches on the apparatus console (not shown) are actuated to feed signals S8 and S9 to the feed control unit 28. The signal S8 designates either automatic or manual sheet feed. The signal S9 is a manual motor on/off signal.

In the manual mode, the signal S8 designates manual operation and the feed control unit 28 feeds a signal S10 to the coder 39 to de-activate the counter 38. The passbook 24 is inserted into the slot and pushed manually into engagement with the feed roller 23. Then, the operator pushes a switch to feed the signal S9 to the feed control unit which causes the motor 22 to be activated and feed the passbook 24 downwardly toward the print head 31. When the operator sees that the passbook 24 has been fed to the proper printing position, he releases the switch causing the signal S9 to be terminated which stops the feed of the passbook 24. Then, the operator enters the next transaction which causes a new stop mark and line of data to be printed. Thereafter, another line of data may be printed through manual feed of the passbook 24 using the switch for producing the signal S9. Alternatively, the pulse generator 37 and counter 38 may be employed for printing subsequent lines of data in a semiautomatic type of feed mode under control of the feed control unit 28. Thereafter, the operator pushes a discharge switch (not shown) which causes the motor 22 to feed the passbook 24 upwardly out of the apparatus 21.

Figure 2:
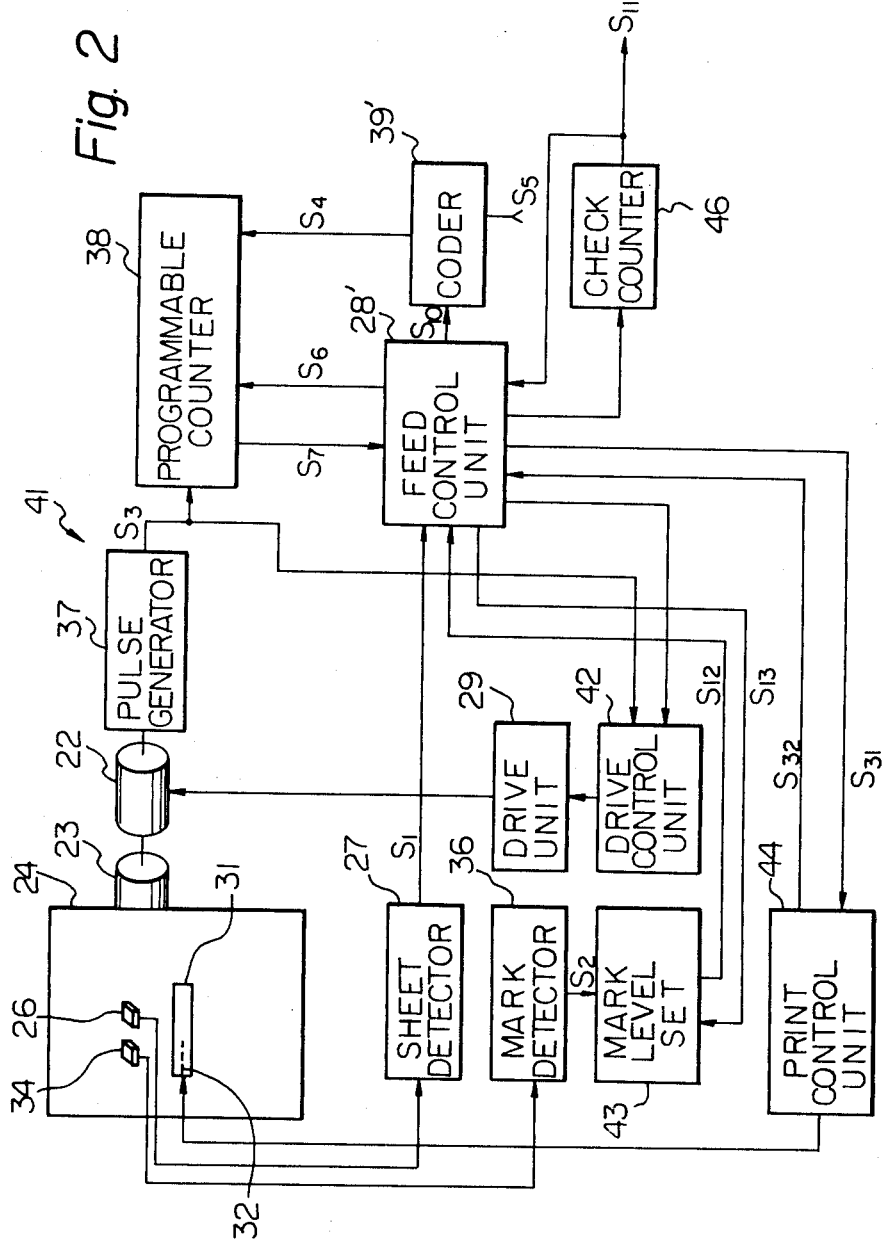
FIG. 2 is similar to FIG. 1 but shows a second embodiment of the present invention.

As mentioned hereinabove, the density for detection of a stop mark is generally higher than that required for legibility of printed data. For this reason, it has been necessary to replace the ink ribbons in the printing mechanisms of the type of apparatus described herein while they are still to produce legibile printed data. A document feed apparatus 41 illustrated in FIG. 2 is adapted to overcome this problem, allowing ribbons to be used until they can no longer produce legibile printed data. Like elements are designated by the same reference numerals used in FIG. 1. Corresponding but somewhat modified elements are designated by the same reference numerals primed.

In the apparatus 41, the mark sensor 34 and detector 36 are used to sense the density of the new stop mark just printed by the print head 31 prior to printing of the new line of data. It will be recalled that the new stop mark is printed two lines below the mark sensor 34. Thus, it is necessary to move the passbook 24 upwardly by two lines until the new stop mark is disposed under the mark sensor 34.

The passbook 24 is initially positioned and the new stop mark printed in the same manner as in the apparatus 21. However, after printing the new stop mark the signal S10 is altered to cause the coder 39' to set the modulo of the counter 28 to a value slightly greater than two lines so that the entire stop mark will pass under the sensor 34. Then, the feed control unit 28' controls the drive unit 29 through a drive control unit 42 to feed the passbook 24 upwardly by about two lines until the new stop mark is positioned under the mark sensor 34. The pulse generator 37 and counter 38 are used in the manner described above to stop the passbook 24 in the proper position.

The output of the mark detector 36 is applied through a mark level set unit 43 to the feed control unit 28'. The set unit 43 comprises a comparator circuit as will be described in detail below and produces a logically high output only when the density of the stop mark is above predetermined value. Then, the feed control unit 28' causes the passbook 24 to be fed downwardly by the same distance until the new stop mark is again in the position 32.

Assuming that the density of the stop mark was sufficient, the next line of data will be printed and the operation of the apparatus 41 continued in the manner described above. However, if the density is insufficient (the set unit 43 produces a logically low output), the following operation is automatically performed.

After the new stop mark reaches the position 32, the feed control unit 28 controls a print control unit 44 to print another stop mark directly on top of the previous new stop mark. In other words, the stop marks are superimposed on the passbook 24. Thus, the density of the two new stop marks in superposition is approximately twice the density of the single new stop mark. Then, the density check procedure is repeated. The passbook 24 is again fed upwardly by slightly more than two lines so that the two new stop marks in superposition are sensed by the mark sensor 34. Then, the passbook 24 is again fed downwardly until the two new stop marks in superposition are again in the printing position 32. Assuming that the sensed density is now above the reference level, the next line of data is printed and the operation of the apparatus 41 continued. However, if the sensed density is still insufficient, a third new stop mark is printed on top of the previous two new stop marks and the density sensing operation repeated. The operations of printing a stop mark, sensing the density of the stop mark and printing more stop marks on top of the stop mark until the density is increased to the reference level may be repeatedly performed any desired number of times in accordance with the present invention.

In actual practice, the ink ribbon (not shown) for the print head 31 will become so depleted that it will become impossible to increase the stop mark density to the reference level even after printing the stop mark a number of times. Prior to this worst case situation, it will become necessary to print each stop mark so many times that the operation of the apparatus 41 will become excessively slow. Thus, it is desirable to provide means for automatically producing an indication when the ribbon has become so depleted that each stop mark must be printed a predetermined number of times to achieve sufficient density.

This function is accomplished in the apparatus 41 by means of a check counter 46. Each time the passbook 24 is moved upwardly to perform a density check the counter 46 is incremented. Typically, the counter 46 has a modulo of three and therefore overflows to produce a carry signal on the count of three. This carry signal constitutes an alarm signal S11. In other words, the counter 46 is incremented to the count of one by the first check operation. After two new stop marks have been printed on top of the initial new stop mark, the counter 46 is incremented two more times and overflows to the count of zero, producing the signal S11. The signal S11 is applied to an annunciator such as an LED (light emitting diode) on the apparatus console (not shown). The signal S11 is also fed to the feed control unit 28′ and may be used to temporarily shut down the apparatus 41 until the ink ribbon is replaced. In any case, the lighted LED informs the operator that the ribbon is depleted to an unacceptable extent and must be replaced in order to prevent a failure to detect the stop mark.

Figure 3:
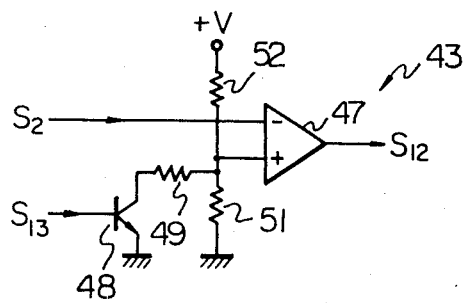
FIG. 3 is an electrical schematic diagram of a mark level circuit of the present apparatus.

In order to ensure detection of stop marks, the reference density which is used in the density check is preferably higher than the reference density used in actual stop mark detection. An example of the mark level set unit 43 constructed to perform this function is illustrated in FIG. 3.

The set unit 43 comprises an operational amplifier 47 connected as a voltage comparator. It will be understood that the mark sensor 34 and detector 36 are analog devices and that the magnitude of the mark detection signal S2 is proportional to the density of the sensed stop mark. The signal S2 is applied to the inverting input of the operational amplifier 47.

A level set signal S13 is applied from the feed control unit 28′ to the base of an NPN transistor 48, the emitter of which is grounded. The collector of the transistor 48 is connected to the non-inverting input of the operational amplifier 47 through a resistor 49. A resistor 51 is connected between the non-inverting input of the operational amplifier 47 and ground. A resistor 52 is connected between the non-inverting input of the operational amplifier 47 and a reference voltage source +V.

For normal detection of stop marks, the signal S13 is logically high and turns on the transistor 48. Thus, the resistor 49 is effectively connected in parallel with the resistor 51. For sensing the density of stop marks, the signal S13 is logically low and the transistor 48 is turned off. Thus, the resistor 48 is effectively disconnected from the circuit.

The effective resistance between the non-inverting input of the operational amplifier and ground forms a voltage divider in combination with the resistor 52. The resistance between the non-inverting input of the operational amplifier 47 and ground and thereby the voltage at the non-inverting input is lower when the transistor 48 is turned on and the resistor 49 is connected in parallel with the resistor 51. Therefore, the voltage at the non-inverting input of the operational amplifier 47, which constitutes the reference voltage for the comparator, is lower during normal stop mark detection than during density sensing. Thus, the signal S2 must have a higher magnitude indicating higher mark density to pass the density check than to be normally detected as a stop mark. In this manner, the stop mark density is always maintained high enough to ensure reliable detection.

Figure 4:
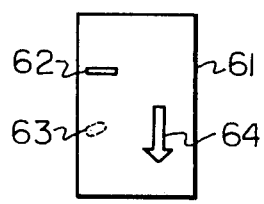
FIGS. 4 and 5 are diagrams illustrating erroneous detection of a piece of dirt as a stop mark in the prior art.
Figure 5:
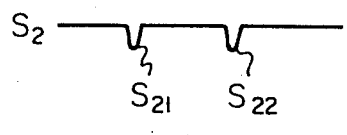

FIGS. 4 and 5 illustrate a problem encountered in the prior art regarding erroneous detection of foreign matter or marks as stop marks. FIG. 4 shows a passbook 61 bearing a true stop mark 62 and a foreign mark 63 such as dirt below the stop mark 62. It is assumed that the passbook 61 is fed downwardly as indicated by an arrow 64 for initial stop mark detection.

In this case, the signal S2 will comprise two logically low pulses S21 and S22 corresponding to the marks 63 and 62 respectively. Since the pulse S21 is produced first, it will be erroneously detected as a stop mark and the new line of data printed one line below the foreign mark 63. Thus, the new line of data will be printed too low as the result of the erroneous stop mark detection.

Figure 6:
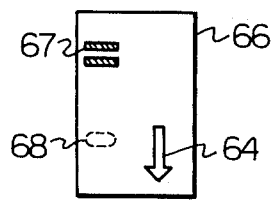
FIGS. 6 and 7 correspond to FIGS. 3 and 4 respectively but illustrate how the erroneous detection is prevented in accordance with the present invention.

In accordance with the present invention, the stop mark 62 consisting of a single horizontal line is replaced by a stop mark 67 shown in FIG. 6 which consists of two parallel horizontal lines extending perpendicular to the direction of the arrow 64. The stop mark 67 may be constituted by an equal sign (=). The passbook is designated as 66. A foreign mark 68 is shown on the passbook 66 below the stop mark 67.

Figure 7:
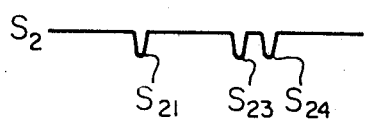
Figure 8:
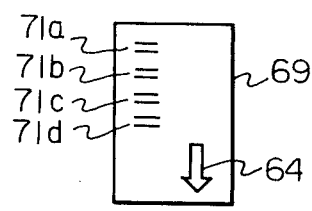
FIG. 8 is a diagram showing a document printed with several stop marks in accordance with the present invention.

As shown in FIG. 7, the signal S2 will comprise a pulse S21 corresponding to the foreign mark 68 and pulses S23 and S24 corresponding to the lower and upper lines of the stop mark 67 respectively. Illustrated in FIG. 8 is a passbook 69 printed with four stop marks 71a, 71b, 71c and 71d.

Figure 9:
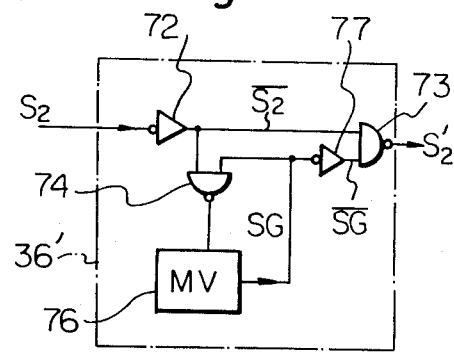
FIG. 9 is an electrical schematic diagram of a mark detection circuit of the present apparatus.
Figure 10:
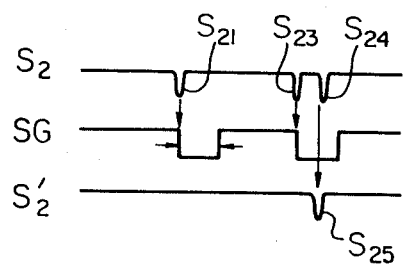
FIG. 10 is a timing diagram of the circuit of FIG. 9.

A portion of a modified mark detector is shown in FIG. 9 and is generally designated as 36′. The detector 36′ operates on the signal S2 to provide a signal S2′ as will be described in detail.

The detector 36′ comprises an inverter 72 which inverts the signal S2. The output of the inverter 72 is connected to inputs of NAND gates 73 and 74. The signal S2′ appears at the output of the NAND gate 73. The output of the NAND gate 74 is connected to a trigger input of a monostable multivibrator 76. The output of the multivibrator 76 is connected to an input of the NAND gate 74 and also to an input of the NAND gate 73 through an inverter 77.

The multivibrator 76, when triggered, is adapted to produce a logically low gate pulse SG having a duration slightly longer than the time between the pulses S23 and S24.

The output of the multivibrator 76 is initially high and is inverted by the inverter 77 to inhibit the NAND gate 73. The logically high initial output of the multivibrator 76 enables the NAND gate 74.

The signal S21 produced by the foreign mark 68 does not pass through the NAND gate 73 since the same is inhibited. However, the pulse S21 does pass through the NAND gate 74 and triggers the multivibrator 76. However, since no pulses occur during the duration of the gate signal SG, the output of the NAND gate 73 remains low. Thus, the pulse S21 corresponding to the foreign mark 68 does not produce an output from the mark detector 36′.

The pulse S23 corresponding to the lower line of the stop mark 67 triggers the multivibrator 76 in the same manner as the pulse S21. In this case, however, the pulse S24 corresponding to the upper line of the stop mark 67 occurs while the gate signal SG is present, or in coincidence therewith. Since the gate signal SG as inverted by the inverter 77 enables the NAND gate 73, the second pulse S24 is gated therethrough. The signal S24 constitutes a mark detection signal. The gate signal SG in its non-inverted form inhibits the NAND gate 74 so that the multivibrator 76 will not be triggered by the pulse S24.

Figure 11:
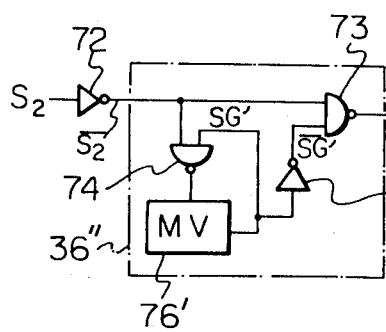
FIGS. 11 and 12 correspond to FIGS. 9 and 10 respectively but illustrate a second embodiment of a mark detection circuit.
Figure 12:
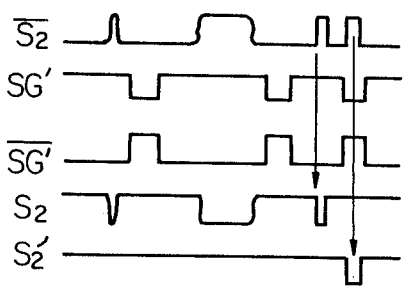

A variation of the mark detector 36' is illustrated in FIGS. 11 and 12 and designated as 36". The detector 36" differs from the detector 36' only in the construction of the multivibrator, which is designated in FIG. 11 as 76'. The multivibrator 76' produces a gate signal SG' which has approximately one-half the duration of the gate signal SG and occurs during the last half of the gate signal SG. In other words, the gate signal SG' is produced to coincide with the pulse S24, if the pulse S24 is present. An internal delay circuit in the multivibrator 76' (not illustrated) delays production of the pulse SG' for a time equal to approximately one-half the duration of the pulse SG. The duration of the pulse SG' may be decreased as desired and may even be shorter than the duration of the pulse S24, as long as it coincides with the pulse S24 in time. It will be further understood that although the detectors 36' and 36" function to sense for the presence of two pulses sequentially within a predetermined length of time, two sensors may be provided to sense for the two lines of the stop mark 67 simultaneously.

The shape of the stop mark 67 may be altered to comprise more than two lines which must be sensed individually either sequentially or simultaneously. The length of the lines may be increased to ensure reliable mark detection when the passbook 66 is fed in skewed manner. Also, it is not necessary for the lengths of the lines to be equal. For example, the stop mark may be constituted by the Japanese katakana character "ni" (二).

The feed control unit 28' and other associated units will now be described in more detail with reference being made to FIGS. 2 and 13.

The feed control unit 28' comprises a check status flip-flop 101 which indicates whether the apparatus 41 is in the normal operating mode or mark density check mode. A high Q output of the flip-flop 101 indicates the normal mode and vice-versa. The flip-flop 101 is initially set by the sheet detection signal S1 through an OR gate 102 upon detection of the lower (leading edge) of the passbook 24. The signal S1 also serves to reset the counter 38, set a feed direction control flip-flop 103 through an OR gate 104 and set a motor on/off control flip-flop 106.

The signal S1 also resets a count enable flip-flop 107, the Q output of which is connected to a count enable input of the counter 38.

The Q output of the flip-flop 101 is fed to the level set unit 43 as the signal S13 and also to the coder 39 as the signal S10. Since the signal S13 is high, the set unit 43 sets the low density reference for the signal S2 and the coder 39 sets the modulo of the counter 38 for one line.

Since the flip-flop 107 is reset, the low Q output thereof inhibits the counter 38 from counting the pulses S3.

The high Q output of the flip-flop 103 indicates downward feed of the passbook 24 as viewed in FIG. 2. The high Q output of the flip-flop 106 indicates that the motor 22 is to be energized.

The Q output of the flip-flop 101 is also applied to an input of an AND gate 108 and to an inverting input of an AND gate 109. The mark detection signal S12 is applied to other inputs of the AND gates 108 and 109. Since the Q output of the flip-flop 101 is high, the AND gate 108 is enabled and the AND gate 109 is inhibited.

The signal S12 which is produced when the lowermost stop mark is detected is gated through the AND gate 108 to set the flip-flop 107. The high Q output of the flip-flop 107 causes the counter 38 to begin counting the pulses S3. When the counter 38 overflows and the carry signal S7 is produced, the passbook 24 is in the proper position for printing the next line of data.

The signal S7 is fed to an input of AND gate 111 and gated therethrough to a mark print pulse generator 112. The generator 112 generates a mark print pulse S31 which causes the print head 31 to print a new stop mark on the passbook 24. The high Q output of the flip-flop 103 applied to another input of the AND gate 111 enables the same. A check pass flip-flop 113 was also reset by the signal S1. The high $\bar{Q}$ output thereof applied to another input of the AND gate 111 enables the same. The signal S7 gated through the AND gate 111 causes the check counter 46 to increment, and also resets the flip-flop 103 to change the feed direction of the passbook 24 to the upward direction. Although the Q output of the flip-flop 106 is still high, causing the motor 22 to be energized, the motor 22 is provided with circuitry which is not shown to temporarily de-energize the same while the direction of rotation is changed. Thus, the passbook 24 is stationary while the stop mark is printed thereon.

Upon printing the stop mark the print control unit 44 feeds a print end signal S2 to the flip-flop 101 which resets the same. The Q output of the flip-flop 101 goes low, causing the coder 39 to change the modulo of the counter 38 to correspond to slightly more than two lines rather than one line of movement of the passbook 24. Also, the reference density level is increased for mark density checking. The low Q output of the flip-flop 101 inhibits the AND gate 108 and enables the AND gate 109.

The output of the counter 38 is decoded by a check gate unit 114 which feeds a high output signal to the AND gate 109 to enable the same when the count of the counter 38 exceeds a predetermined value. With the passbook 24 in the position for printing the new line of data, it will be noted that, with reference being made to FIG. 1, the stop mark 33b is positioned under the mark sensor 34 and the mark 33c is positioned between the mark sensor 34 and the print head 31. Since it is desired to check the density of the stop mark which was just printed, it is necessary to inhibit detection of the stop marks 33b and 33c. The check gate unit 114 inhibits the AND gate 109 until enough pulses S3 have been counted for the stop marks 33b and 33c to clear the mark sensor 34.

With the Q output of the flip-flop 103 low the passbook 24 is fed upwardly until the counter 38 overflows, or until the new stop mark is positioned under the mark sensor 34. The carry signal S7 from the counter 38 is fed through an AND gate 116 and the OR gate 104 to set the flip-flop 103 and change the feed direction to downward. The AND gate 116 is enabled by high $\bar{Q}$ outputs of the flip-flops 103 and 113.

Assuming that the stop mark is sufficiently dark to be detected by the mark detector 36, the mark detection signal S12 is gated through the AND gate 109 and sets the check pass flip-flop 113 and check status flip-flop 101. The output of the AND gate 109 also resets the coder 39 and the check counter 46, the latter through an OR gate 117. The check counter 46 is also reset through the OR gate 117 by the sheet detection signal S1. In addition, the output signal of the AND gate 109 is fed as a check pass signal S33 to a central control unit (not shown) of the apparatus 41.

The high Q output of the flip-flop 113 enables as AND gate 118 which gates the signal S7 therethrough when the passbook 24 reaches the printing position. The signal S7 gated through the AND gate 118 resets the flip-flop 106 to stop the motor 22.

Assuming that the density of the stop mark is insufficient to be detected by the mark detector 36, the stop mark is repeatedly printed and sensed until either the density becomes sufficient or the counter 46 overflows to produce the alarm signal S31.

In summary, it will be seen that the present invention provides a document feed apparatus which reliably detects and prints stop marks on a document such as a bank passbook, and furthermore increases the useful life of ink ribbons used in printers. Various modifications will become possible for those skilled in the art after receiving the teachings of the present disclosure without departing from the scope thereof.

What is claimed is:

1. A document feed apparatus comprising:
   mark detector means for detecting a stop mark on a document;
   printing means for printing a stop mark on the document;
   feed means for feeding the document relative to the mark detector means and printing means;
   pulse generator means for generating pulses corresponding to feed increments of the document;
   counter means for counting the pulses; and
   control means constructed to control the counter means to count a predetermined number of pulses after the mark detector means detects a first stop mark on the document, the control means controlling the feed means to stop feeding the document and controlling the printing means to print a second stop mark on the document spaced from the first stop mark after the counter has counted the predetermined number of pulses;
   the counter being a programmable counter, the predetermined number of pulses being selectively variable and corresponding to a modulo of the counter;
   the first and second stop marks each comprising two parallel lines extending perpendicular to a direction of the document, the mark detector means being constructed to detect the two lines individually;
   the mark detector means being constructed to sequentially detect the two lines and produce a mark detection signal only when the two lines are detected within a predetermined length of time.

2. An apparatus as in claim 1, in which the mark detector means comprises a pulse generator for generating a gate signal for the predetermined length of time in response to detection of a first of the two lines and means for producing the mark detection signal when the second of the two lines is detected in coincidence with the gate signal.

3. A document feed apparatus comprising:
   mark detector means for detecting a stop mark on a document;
   printing means for printing a stop mark on the document;
   feed means for feeding the document relative to the mark detector means and printing means;
   pulse generator means for generating pulses corresponding to feed increments of the document;
   counter means for counting the pulses; and
   control means constructed to control the counter means to count a predetermined number of pulses after the mark detector means detects a first stop mark on the document, the control means controlling the feed means to stop feeding the document and controlling the printing means to print a second stop mark on the document spaced from the first stop mark after the counter has counted the predetermined number of pulses;
   the mark detector means being adapted to sense a density of the second stop mark;
   the control means being constructed to repeatedly print stop marks on top of the second stop mark until the sensed density reaches a predetermined value.

4. An apparatus as in claim 3, in which the control means is constructed to produce a signal after a predetermined number of stop marks have been printed on top of the second stop mark.

5. A document feed apparatus comprising:
   mark detector means for detecting a stop mark on a document;
   printing means for printing a stop mark on the document;
   feed means for feeding the document relative to the mark detector means and printing means;
   pulse generator means for generating pulses corresponding to feed increments of the document;
   counter means for counting the pulses; and
   control means constructed to control the counter means to count a predetermined number of pulses after the mark detector means detects a first stop mark on the documents, the control means controlling the feed means to stop feeding the document and controlling the printing means to print a second stop mark on the document spaced from the first stop mark after the counter has counted the predetermined number of pulses;
   the mark detector means being adapted to sense a density of the second stop mark;
   the control means constructed to control the printing means to print a third stop mark on top of the second stop mark if the sensed density of the second stop mark is below a predetermined value;
   the mark detector means being adapted to detect the first stop mark when the density thereof is above a predetermined value which is lower than said predetermined value.

6. A document feed apparatus comprising:
   mark detector means for detecting a stop mark on a document;
   printing means for printing a stop mark on the document;
   feed means for feeding the document relative to the mark detector means and printing means;
   pulse generator means for generating pulses corresponding to feed increments of the document;
   counter means for counting the pulses; and
   control means constructed to control the counter means to count a predetermined number of pulses after the mark detector means detects a first stop mark on the document, the control means controlling the feed means to stop feeding the document and controlling the printing means to print a second stop mark on the ducument spaced from the first stop mark after the counter has counted the predetermined number of pulses;
the mark detector means being adapted to sense a density of the second stop mark;
the control means being constructed to control the printing means to print a third stop mark on top of the second stop mark if the sensed density of the second stop mark is below a predetermined value; p1 the feed means being constructed to feed the document in a first direction prior to printing of the second stop mark, then in a second direction which is opposite to the first direction until the density of the second stop mark is sensed by the mark detector means and then in the first direction until the document is moved to a position for printing the third stop mark.

7. A document feed apparatus comprising:
mark detector means for detecting a stop mark on a document;
printing means for printing a stop mark on the document;
feed means for feeding the document relative to the mark detector means and printing means; and
control means for controlling the feed means to stop feeding the document after the mark detector means detects a first stop mark on the document and controlling the printing means to print a second stop mark on the document spaced from the first stop mark;
the mark detector means being adapted to sense a density of the second stop mark;
the control means being constructed to control the printing means to print a third stop mark on top of the second stop mark if the sensed density of the second stop mark is below a predetermined value.

8. An apparatus as in claim 7, in which the mark detector means is adapted to detect the first stop mark when the density thereof is above a predetermined value which is lower than said predetermined value.

9. An apparatus as in claim 7, in which the feed means is constructed to feed the document in a first direction prior to printing of the second stop mark, then in a second direction which is opposite to the first direction until the density of the second stop mark is sensed by the mark detector means and then in the first direction until the document is moved to a position for printing the third stop mark.

10. A document feed apparatus comprising:
mark detector means for detecting a stop mark on a document;
printing means for printing a stop mark on the document;
feed means for feeding the document relative to the mark detector means and printing means; and
control means for controlling the feed means to stop feeding the document after the mark detector means detects a first stop mark on the document and controlling the printing means to print a second stop mark on the document spaced from the first stop mark;
the mark detector means being adapted to sense a density of the second stop mark;
the control means being constructed to repeatedly print stop marks on top of the second stop mark until the sensed density reaches a predetermined value.

11. An apparatus as in claim 10, in which the control means is constructed to produce a signal after a predetermined number of stop marks have been printed on top of the second stop mark.

12. A document feed apparatus comprising:
mark detector means for detecting a stop mark on a document;
printing means for printing a stop mark on the document;
feed means for feeding the document relative to the mark detector means and printing means;
pulse generator means for generating pulses corresponding to feed increments of the document;
counter means for counting the pulses; and
control means constructed to control the counter means to count a predetermined number of pulses after the mark detector means detects a first stop mark on the document, the control means controlling the feed means to stop feeding the document and controlling the printing means to print a second stop mark on the document spaced from the first stop mark after the counter has counted the predetermined number of pulses;
the first and second stop marks each comprising two parallel lines extending perpendicular to a direction of movement of the document, the mark detector means being constructed to detect the two lines individually.

13. An apparatus as in claim 12, in which the mark detector means is constructed to sequentially detect the two lines and produce a mark detection signal only when the two lines are detected within a predetermined length of time.

14. An apparatus as in claim 13, in which the mark detector means comprises a pulse generator for generating a gate signal for the predetermined length of time in response to detection of a first of the two lines and means for producing the mark detection signal when the second of the two lines is detected in coincidence with the gate signal.

15. A document feed apparatus comprising:
mark detector means for detecting a stop mark on a document; and
feed means for feeding the document relative to the mark detector means;
the stop mark comprising two parallel lines extending perpendicular to the direction of movement of the document, the mark detector means being constructed to detect the two lines individually.

16. An apparatus as in claim 15, in which the mark detector means is constructed to sequentially detect the two lines and produce a mark detection signal only when the two lines are detected within a predetermined length of time.

17. An apparatus as in claim 16, in which the mark detector means comprises a pulse generator for generating a gate signal for the predetermined length of time in response to detection of a first of the two lines and means for producing the mark detection signal when the second of the two lines is detected in coincidence with the gate signal.

18. A document feed apparatus comprising:
mark detector means for detecting a stop mark on a document;
printing means for printing a stop mark on the document;
feed means for feeding the document relative to the mark detector means and printing means;

pulse generator means for generating pulses corresponding to feed increments of the document;

counter means for counting the pulses; and control means constructed to control the counter means to count a predetermined number of pulses after the mark detector means detects a first stop mark on the document, the control means controlling the feed means to stop feeding the document and controlling the printing means to print a second stop mark on the document spaced from the first stop mark after the counter has counted the predetermined number of pulses;

the counter being a programmable counter, the predetermined number of pulses being selectively variable and corresponding to a modulo of the counter;

the mark detector means being adapted to sense a density of the second stop mark;

the control means being constructed to control the printing means to print a third stop mark on top of the second stop mark if the sensed density of the second stop mark is below a predetermined value.

19. An apparatus as in claim 18, in which the mark detector means is adapted to detect the first stop mark when the density thereof is above a predetermined value which is lower than said predetermined value.

20. An apparatus as in claim 18, in which the feed means is constructed to feed the document in a first direction prior to printing of the second stop mark, then in a second direction which is opposite to the first direction until the density of the second stop mark is sensed by the mark detector means and then in the first direction until the document is moved to a position for printing the third stop mark.

21. An apparatus as in claim 18, further comprising document detector means for detecting a leading edge of the document and controlling the feed means to begin feeding the document in response thereto.

22. A document feed apparatus comprising:

mark detector means for detecting a stop mark on a document;

printing means for printing a stop mark on the document;

feed means for feeding the document relative to the mark detector means and printing means;

pulse generator means for generating pulses corresponding to feed increments of the document;

counter means for counting the pulses; and control means constructed to control the counter means to count a predetermined number of pulses after the mark detector means detects a first stop mark on the document, the control means controlling the feed means to stop feeding the document and controlling the printing means to print a second stop mark on the document spaced from the first stop mark after the counter has counted the predetermined number of pulses;

the counter being a programmable counter, the predetermined number of pulses being selectively variable and corresponding to a modulo of the counter;

the mark detector means being adapted to sense a density of the second stop mark;

the control means being constructed to respectedly print stop marks on top of the second stop mark until the sensed density reaches a predetermined value.

23. An apparatus as in claim 22, in which the control means is constructed to produce a signal after a predetermined number of stop marks have been printed on top of the second stop mark.

* * * * *

UNITED STATES PATENT AND TRADEMARK OFFICE
CERTIFICATE OF CORRECTION

PATENT NO. : 4,227,644
DATED : Oct. 14, 1980
INVENTOR(S) : Yukio Sakano

It is certified that error appears in the above—identified patent and that said Letters Patent is hereby corrected as shown below:

Add the following to the foreign application priority data:

--Aug. 19, 1977 [JP] Japan ........52/110593

Signed and Sealed this

Fourth Day of August 1981

[SEAL]

Attest:

GERALD J. MOSSINGHOFF

*Attesting Officer*  *Commissioner of Patents and Trademarks*